(12) United States Patent
McAlister

(10) Patent No.: US 9,314,719 B2
(45) Date of Patent: Apr. 19, 2016

(54) FILTER HAVING SPIRAL-SHAPED DISTRIBUTOR CHANNELS

(75) Inventor: Roy Edward McAlister, Phoenix, AZ (US)

(73) Assignee: McAlister Technologies, LLC, Pheonix, AZ (US)

( * ) Notice: Subject to any disclaimer, the term of this patent is extended or adjusted under 35 U.S.C. 154(b) by 0 days.

(21) Appl. No.: 13/584,790

(22) Filed: Aug. 13, 2012

(65) Prior Publication Data

US 2013/0206698 A1 Aug. 15, 2013

Related U.S. Application Data

(60) Provisional application No. 61/523,273, filed on Aug. 12, 2011.

(51) Int. Cl.
| | |
|---|---|
| *B01D 29/90* | (2006.01) |
| *B01D 24/14* | (2006.01) |
| *B01D 24/40* | (2006.01) |
| B01D 29/56 | (2006.01) |
| B01D 35/18 | (2006.01) |
| B01D 39/20 | (2006.01) |
| B01D 53/04 | (2006.01) |

(52) U.S. Cl.
CPC .............. *B01D 29/90* (2013.01); *B01D 24/14* (2013.01); *B01D 24/405* (2013.01); *B01D 29/56* (2013.01); *B01D 35/18* (2013.01); *B01D 39/2041* (2013.01); *B01D 39/2055* (2013.01); *B01D 53/0407* (2013.01); *B01D 2251/102* (2013.01)

(58) Field of Classification Search
CPC ...... B01D 24/14; B01D 24/405; B01D 29/90; B01D 2251/102; B01D 53/0407; B01D 39/2055; B01D 39/2041; B01D 29/56; B01D 35/18

USPC .................... 210/497.1, 502.1, 510.1; 55/520
See application file for complete search history.

(56) References Cited

U.S. PATENT DOCUMENTS 1,753,809 A * 4/1930 Short ........................... 210/439
3,404,061 A 10/1968 Shade et al.
(Continued)

FOREIGN PATENT DOCUMENTS

EP 0025858 4/1981
EP 0056717 B1 7/1982
(Continued)

OTHER PUBLICATIONS

Dash, J.C. "Two-Dimensional Matter." Scientific American. May 1973. pp. 30-40.
(Continued)

*Primary Examiner* — Matthew O Savage
(74) *Attorney, Agent, or Firm* — Perkins Coie LLP

(57) ABSTRACT

Fluid distribution filters having spiral filter media and associated systems and methods are disclosed herein. In one embodiment, for example, a filter assembly can include a canister having a body portion positioned between a first opening and a second opening. The filter assembly can further include a filter media positioned in the body portion of the canister. The filter media can include at least one channel in fluid communication with the first and second openings. The channel can have a spiral-like shape and be configured to distribute incoming fluid across the filter media and move the fluid at a substantially equal velocity across the filter media.

12 Claims, 2 Drawing Sheets

(56) References Cited

U.S. PATENT DOCUMENTS

| | | | |
|---|---|---|---|
| 3,830,204 | A | 8/1974 | McAlister |
| 3,935,354 | A | 1/1976 | Olcott |
| 3,967,256 | A | 6/1976 | Galatis |
| 4,066,046 | A | 1/1978 | McAlister |
| 4,077,788 | A | 3/1978 | Woollam |
| 4,094,762 | A | 6/1978 | Clelland |
| 4,193,827 | A | 3/1980 | Woollam |
| 4,210,103 | A | 7/1980 | Dimitroff et al. |
| 4,407,238 | A | 10/1983 | Yoon |
| 4,472,275 | A | 9/1984 | Yano |
| 4,495,074 | A | 1/1985 | Hagiwara |
| 4,567,857 | A | 2/1986 | Houseman et al. |
| 4,588,106 | A | 5/1986 | Stark, Sr. et al. |
| 4,600,529 | A | 7/1986 | Hallen et al. |
| 4,676,972 | A | 6/1987 | Velenyi et al. |
| 4,696,742 | A * | 9/1987 | Shimazaki .................. 210/287 |
| 5,017,317 | A | 5/1991 | Marcus |
| 5,067,447 | A | 11/1991 | Iwaki et al. |
| 5,220,080 | A | 6/1993 | Lyons et al. |
| 5,284,996 | A | 2/1994 | Vickers |
| 5,298,046 | A * | 3/1994 | Peisert ...................... 55/486 |
| 5,343,699 | A | 9/1994 | McAlister |
| 5,618,501 | A | 4/1997 | Wieres et al. |
| 5,639,707 | A | 6/1997 | Lewis et al. |
| 5,648,184 | A | 7/1997 | Inoue et al. |
| 5,683,547 | A | 11/1997 | Azuma |
| 5,731,046 | A | 3/1998 | Mistry |
| 5,772,938 | A | 6/1998 | Sharp |
| 5,822,838 | A | 10/1998 | Seal et al. |
| 5,829,418 | A | 11/1998 | Tamura et al. |
| 5,916,531 | A * | 6/1999 | Pan ........................... 422/211 |
| 6,015,041 | A | 1/2000 | Heung |
| 6,015,065 | A | 1/2000 | McAlister |
| 6,155,212 | A | 12/2000 | McAlister |
| 6,306,198 | B1 | 10/2001 | Corbin |
| 6,432,176 | B1 | 8/2002 | Klos et al. |
| 6,466,597 | B1 | 10/2002 | Kume et al. |
| 6,503,584 | B1 | 1/2003 | McAlister |
| 6,591,857 | B2 | 7/2003 | Engle et al. |
| 6,626,981 | B2 | 9/2003 | Wojtowicz et al. |
| 6,660,063 | B2 | 12/2003 | Tom et al. |
| 6,709,497 | B2 | 3/2004 | Myasnikov et al. |
| 6,743,278 | B1 | 6/2004 | Carruthers |
| 6,756,140 | B1 | 6/2004 | McAlister |
| 6,834,508 | B2 | 12/2004 | Bradley et al. |
| 6,840,264 | B1 | 1/2005 | Bhavsar et al. |
| 6,860,923 | B2 | 3/2005 | Myasnikov et al. |
| 6,918,382 | B2 | 7/2005 | Ramachandran et al. |
| 6,918,430 | B2 | 7/2005 | Myasnikov et al. |
| 6,939,394 | B2 | 9/2005 | Carruthers |
| 7,011,768 | B2 | 3/2006 | Jensen et al. |
| 7,048,839 | B2 | 5/2006 | Harada |
| 7,097,748 | B2 | 8/2006 | Duffy et al. |
| 7,112,239 | B2 | 9/2006 | Kimbara et al. |
| 7,160,361 | B2 * | 1/2007 | Meiller et al. .................. 95/143 |
| 7,169,214 | B2 | 1/2007 | Kubo et al. |
| 7,169,489 | B2 | 1/2007 | Redmond |
| 7,172,645 | B1 | 2/2007 | Pfister et al. |
| 7,241,331 | B2 | 7/2007 | Wu et al. |
| 7,306,862 | B2 | 12/2007 | Kramer et al. |
| 7,320,726 | B2 | 1/2008 | Shih et al. |
| 7,323,043 | B2 | 1/2008 | Finamore |
| 7,325,401 | B1 | 2/2008 | Kesseli et al. |
| 7,331,178 | B2 | 2/2008 | Goldman |
| 7,363,965 | B2 | 4/2008 | Myasnikov et al. |
| 7,399,325 | B1 | 7/2008 | Redmond |
| 7,418,782 | B2 | 9/2008 | Kimbara et al. |
| 7,431,756 | B2 | 10/2008 | Myasnikov et al. |
| 7,455,719 | B2 | 11/2008 | Carruthers |
| 7,455,723 | B2 | 11/2008 | Voss et al. |
| 7,494,530 | B2 | 2/2009 | Carruthers |
| 7,594,939 | B2 | 9/2009 | Goldstein et al. |
| 7,712,605 | B2 | 5/2010 | Suzuki et al. |
| 7,727,492 | B2 | 6/2010 | Myasnikov et al. |
| 7,744,127 | B2 | 6/2010 | Essinger et al. |
| 7,771,512 | B2 | 8/2010 | Norton et al. |
| 7,780,747 | B2 | 8/2010 | Carruthers et al. |
| 7,896,190 | B2 | 3/2011 | Berger et al. |
| 7,911,071 | B2 | 3/2011 | Devine |
| 8,002,880 | B2 | 8/2011 | Carruthers |
| 8,015,808 | B2 | 9/2011 | Keefer et al. |
| 8,066,946 | B2 | 11/2011 | Redmond |
| 8,147,599 | B2 | 4/2012 | McAlister |
| 8,318,269 | B2 | 11/2012 | McAlister |
| 8,617,399 | B2 | 12/2013 | McAlister |
| 8,641,810 | B2 | 2/2014 | McAlister |
| 8,828,491 | B2 | 9/2014 | McAlister |
| 8,898,416 | B2 | 11/2014 | McAlister |
| 9,079,489 | B2 | 7/2015 | McAlister |
| 2002/0112479 | A1 | 8/2002 | Keefer et al. |
| 2002/0122972 | A1 | 9/2002 | Klitsner et al. |
| 2003/0037674 | A1 | 2/2003 | Allie et al. |
| 2003/0167923 | A1 | 9/2003 | Grote et al. |
| 2003/0170389 | A1 | 9/2003 | Sandhu |
| 2003/0209149 | A1 | 11/2003 | Myasnikov et al. |
| 2004/0076561 | A1 | 4/2004 | Kajiura et al. |
| 2004/0185184 | A1 | 9/2004 | Sandhu |
| 2004/0200460 | A1 | 10/2004 | Mitani et al. |
| 2005/0148466 | A1 | 7/2005 | Lemmon et al. |
| 2005/0178365 | A1 | 8/2005 | Washeleski et al. |
| 2006/0048808 | A1 | 3/2006 | Ruckman et al. |
| 2006/0088739 | A1 | 4/2006 | Ovshinsky |
| 2006/0151382 | A1* | 7/2006 | Petrik .......................... 210/490 |
| 2008/0142377 | A1 | 6/2008 | Suzuki et al. |
| 2008/0190943 | A1 | 8/2008 | Demaria et al. |
| 2008/0203101 | A1 | 8/2008 | Kimbara et al. |
| 2008/0226532 | A1 | 9/2008 | Zak-Fang et al. |
| 2009/0014062 | A1 | 1/2009 | Kayama et al. |
| 2009/0104496 | A1 | 4/2009 | Christensen et al. |
| 2009/0214800 | A1 | 8/2009 | Saito |
| 2009/0229555 | A1 | 9/2009 | Ginzburg et al. |
| 2010/0047633 | A1 | 2/2010 | Brandstetter et al. |
| 2011/0041519 | A1 | 2/2011 | McAlister |
| 2012/0003518 | A1 | 1/2012 | Fischel |
| 2012/0048195 | A1 | 3/2012 | Lin |
| 2012/0156578 | A1 | 6/2012 | Taniguchi et al. |
| 2013/0101808 | A1 | 4/2013 | McAlister |
| 2013/0224614 | A1 | 8/2013 | Fabian et al. |
| 2014/0272195 | A1 | 9/2014 | McAlister |
| 2014/0272640 | A1 | 9/2014 | McAlister |
| 2014/0356245 | A1 | 12/2014 | McAlister |
| 2015/0010450 | A1 | 1/2015 | McAlister |

FOREIGN PATENT DOCUMENTS

| | | |
|---|---|---|
| EP | 1108588 A2 | 6/2001 |
| EP | 1256369 A2 | 11/2002 |
| JP | 2002128501 A | 5/2002 |
| JP | 2006035174 A | 2/2006 |
| JP | 2007077265 A | 3/2007 |
| KR | 10-2012-0010420 | 2/2012 |
| WO | WO 93-12867 A1 | 7/1993 |
| WO | WO-96/41745 | 12/1996 |
| WO | WO 99/35297 A1 | 7/1999 |
| WO | WO-02/056400 | 7/2002 |
| WO | WO-03/078252 A2 | 9/2003 |
| WO | WO-2004/016982 A2 | 2/2004 |
| WO | WO-2004/024845 A2 | 3/2004 |
| WO | WO-2004/050798 A2 | 6/2004 |
| WO | WO-2004/053383 A2 | 6/2004 |
| WO | WO-2004/108590 A2 | 12/2004 |
| WO | WO2006112919 A2 | 10/2006 |

OTHER PUBLICATIONS

Donnet et al. Carbon Black: Physics, Chemistry, and Elastomer Reinforcement. New York: M. Dekker, 1976. pp. 16-18.

Steinberg, Meyer. "The Hy-C Process (thermal Decomposition of Natural Gas) Potentially the Lowest Cost Source of Hydrogen with the Least $CO_2$ Emission." Energy Conversion and Management, vol. 36, No. 6-9 (1995): pp. 791-796.

(56) References Cited

OTHER PUBLICATIONS

Sun et al. "High-pressure Laminar Flame Speeds and Kinetic Modeling of Carbon Monoxide/hydrogen Combustion." Proceedings of the Combustion Institute, vol. 31, Issue 1 (Jan. 2007). pp. 439-446.
Japanese Office Action for PCT/US10/45668; Applicant: McAlister Technologies, LLC, Date of Mailing: Aug. 21, 2012, 4 pages.
International Search Report and Written Opinion for Application No. PCT/US2012/050665; Applicant: McAlister Technologies, LLC.; Date of Mailing: Feb. 26, 2013, 9 pages.
International Search Report and Written Opinion for Application No. PCT/US2010/045668; Applicant: McAlister, Roy E.; Date of Mailing: Jul. 22, 2011, 9 pages.
International Search Report and Written Opinion for Application No. PCT/US2014/030725; Applicant: McAlister Technologies, LLC; Date of Mailing: Aug. 19, 2014, 11 pages.
International Search Report and Written Opinion for Application No. PCT/US2014/040072; Applicant: McAlister Technologies, LLC; Date of Mailing: Sep. 29, 2014, 11 pages.
International Search Report and Written Opinion for Application No. PCT/US2014/030816; Applicant: McAlister Technologies, LLC; Date of Mailing: Aug. 12, 2014, 12 pages.
International Search Report and Written Opinion for Application No. PCT/US2012/050650; Applicant: McAlister Technologies, LLC; Date of Mailing: Feb. 25, 2013, 9 pages.

* cited by examiner

FILTER HAVING SPIRAL-SHAPED DISTRIBUTOR CHANNELS

CROSS-REFERENCE TO RELATED APPLICATION(S)

This application claims the benefit of and priority to U.S. Provisional Application No. 61/523,273, filed Aug. 12, 2011, and entitled, "FLUID DISTRIBUTION FILTER HAVING SPIRAL FILTER MEDIA AND ASSOCIATED SYSTEMS AND METHODS," which is incorporated herein by reference in its entirety.

TECHNICAL FIELD

The present technology relates generally to filtration systems and, more particularly, to fluid distribution filters having spiral filter media and associated systems and methods.

BACKGROUND

Filtration systems can be used to intercept and remove undesirable particles or substances that either occur naturally in a fluid or are in some way introduced into the fluid. For example, industrial plants (e.g., refineries) typically use filtration systems to remove harmful by-products (e.g., sulfur) from fluid streams. During filtration, a fluid is passed through a succession of filter media having progressively smaller pore sizes to capture decreasingly sized particles from the fluid. The fluid flows naturally along a central portion of the filter media, which leaves peripheral portions of the filter media unused and causes the formation of stagnant pockets of fluid (e.g., "dead zones") that do not progress through the filter media. Accordingly, there is a need for a filtration system having enhanced fluid distribution and increased efficiency.

DETAILED DESCRIPTION

The present disclosure is directed toward fluid distribution filters having spiral filter media and associated systems and methods. For example, several embodiments described below are directed toward filter assemblies that enhance the efficiency of filtration by distributing fluid across a filter media and providing a substantially equal fluid velocity through the filter assembly. In various embodiments, the filter media can be loaded with a contaminant (e.g., sulfur) and/or compound thereof (e.g., calcium sulfate), and subsequently unloaded such that the filter media can be reused for additional filtration cycles and/or the contaminant can be repurposed for other applications. As used herein, the term "fluid" can include liquids, gases, plasmas, and/or solutions, some of which may include solid particles dispersed throughout the fluid. Additionally, several embodiments described herein refer to filtering contaminants from a fluid. The term "contaminant" is to be construed broadly to refer to any substance being removed from a fluid by the filter media.

Certain details are set forth in the following description and in FIGS. 1A-2 to provide a thorough understanding of various embodiments of the disclosure. However, other details describing well-known structures and systems often associated with filters, filter media, and/or other aspects of filtration systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics described with reference to a particular embodiment may be combined in any suitable manner in one or more other embodiments. Moreover, the headings provided herein are for convenience only and do not interpret the scope or meaning of the claimed disclosure.

Figure 1A:
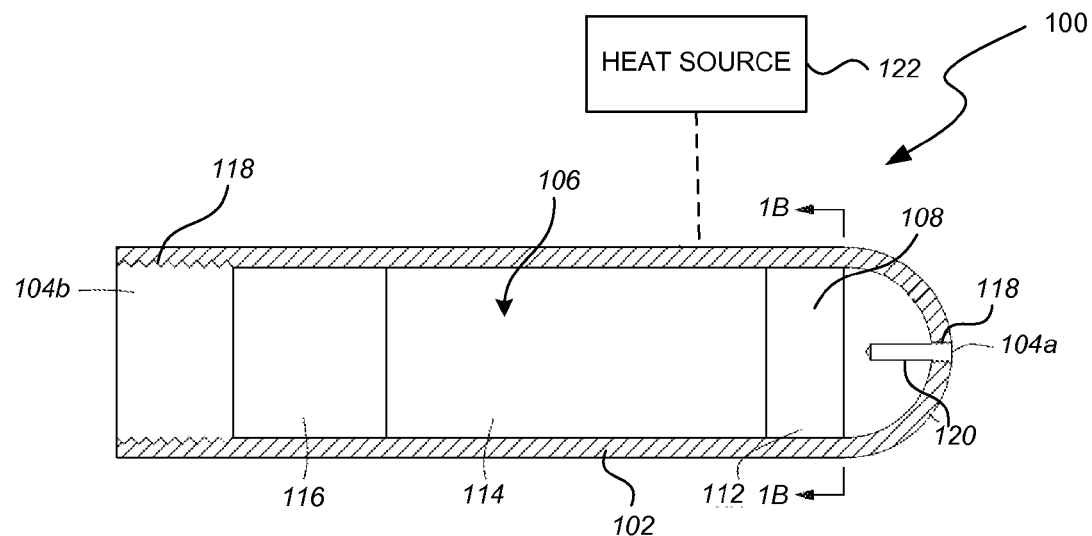
FIG. 1A is a cross-sectional view of a filter assembly configured in accordance with an embodiment of the present technology.
Figure 1B:
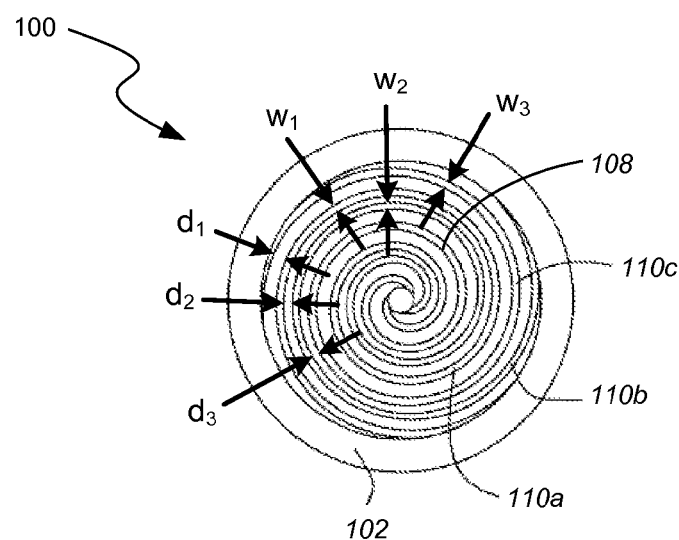
FIG. 1B is a top view of the filter assembly of FIG. 1A taken substantially along the line 1B-1B.

FIG. 1A is a cross-sectional view of a filter assembly 100 configured in accordance with an embodiment of the present technology, and FIG. 1B is a top view of the filter assembly 100 of FIG. 1A taken substantially along the line of imaginary plane 1B-1B. Referring to FIG. 1A, the filter assembly 100 can include a housing or canister 102 having a body portion 106 positioned between apertures or openings (identified individually as a first opening 104a and a second opening 104b, and referred to collectively as openings 104) at opposite end portions of the canister 102.

In the illustrated embodiment, the first opening 104a is part of a fitting 120 coupled to the canister 102, but in other embodiments the first opening 104a extends any suitable distance including directly through the canister 102 to distribute fluid through passageways defined by suitable extension into zone 106 of spiral distributor system 108 for flow 110 including portions 110a, 110b, 110c, etc. Additionally, as shown in the illustrated embodiment, the first opening 104a can have a smaller cross-sectional dimension (e.g., diameter) than the second opening 104b. In other embodiments, the openings 104 can be equal in size or have different dimensions relative to one another. The first opening 104a can be configured as an inlet through which unfiltered fluid enters the filter assembly 100, and the second opening 104b can be configured as an outlet through which filtered fluid exits the filter assembly 100. In other embodiments, the inlet and the outlet can be reversed. As described in further detail below, the openings 104 can also be configured to serve as both the inlet and the outlet depending upon whether the filter assembly 100 is being loaded or unloaded with a contaminant.

The canister 102 can be molded or otherwise formed from selected alloys by powder metallurgy, casting, cold heading, forging, or by injection molding or thermoforming from a polymer material. Polymer particles, such as polyfin particles made from recycled milk, juice, water, and/or other fluid containers, can be compression molded to form the shape of the canister 102. In other embodiments, the canister 102 can be molded into two or more pieces that are subsequently joined by gluing, welding, and/or using suitable fastening methods known in the art. In other embodiments, the canister 102 can be formed from a transmissive material (e.g., glass or ceramic compositions) and/or other suitable materials.

Referring now to FIG. 1B, the body portion 106 of the canister 102 can house a filter media 108 that removes a contaminant from a fluid. The filter media 108 can be made from various filtration materials that remove contaminants from the fluid via physical barriers and/or chemical reactions, such as steel wool, micro-porous ceramics, materials loaded with calcium or magnesium, and/or other suitable filtration materials. In selected embodiments, for example, the filter media 108 includes a structure made of plastic, silica, alumina, and/or other material that can be loaded with an element or compound, such as an activated carbon that can react with water to remove objectionable concentrations of sulfur or compounds containing sulfur, various phosphors, heavy metals such as lead or mercury, pathogens, and/or other contaminants from the water. In other embodiments, the filter media 108 can be made from an architectural construct. Architectural constructs are synthetic matrix characterizations of crystals that are primarily comprised of graphene, graphite, boron nitride, and/or another suitable crystal. The configuration and the treatment of these crystals heavily influences the properties that the architectural construct will exhibit when it experiences certain conditions. For example, architectural constructs can be manipulated to obtain the requisite surface tension to load almost any element or soluble to selectively filter a fluid. Additional features and characteristics of architectural constructs are described in U.S. patent application Ser. No. 13/027,214, filed Feb. 14, 2011, now issued as U.S. Pat. No. 8,980,416, and entitled "ARCHITECTURAL CONSTRUCT HAVING FOR EXAMPLE A PLURALITY OF ARCHITECTURAL CRYSTALS"; U.S. patent application Ser. No. 13/584,658, filed Aug. 13, 2012, and entitled "ARCHITECTURAL CONSTRUCT HAVING A PLURALITY OF IMPLEMENTATIONS"; and U.S. patent application Ser. No. 13/584,644, filed Aug. 13, 2012, now issued as U.S. Pat. No. 8,828,491, and entitled "METHODS FOR MANUFACTURING ARCHITECTURAL CONSTRUCTS", each of which is incorporated herein by reference in its entirety.

In various embodiments, the filter assembly 100 can be configured to remove sulfur from potable water or a fluid fuel. Sulfur occurs naturally in various fluids and is introduced into fluids during various processes (e.g., thermochemical processes), but must typically be removed from the fluid before it is deemed suitable for use (e.g., as fuel, drinking water, etc.). Typical sulfur filters first remove sulfur from a fluid by forming hydrogen sulfide and subsequently dissociating the hydrogen sulfide (e.g., by electrolysis or adding heat) to separate the sulfur. However, in particular embodiments of the present technology, the filter media 108 can react directly with the incoming fluid to remove the sulfur, thereby eliminating the intermediary step of forming hydrogen sulfide. For example, when steel wool is used as the filter media 108, diesel fuel and/or other fuels can be fed into the canister 102 via one of the openings 104 causing the steel wool and the sulfur donor to react to form iron sulfide that becomes trapped in the filter media 108. In other embodiments, the filter media 108 can include calcium and/or magnesium, and the sulfur can react therewith to form calcium sulfate and/or magnesium sulfate, respectively. In further embodiments, the filter media 108 can include additional elements or compounds that react with the sulfur to filter it from the fluid. In still further embodiments, the filter assembly 100 can perform the intermediary step of forming hydrogen sulfide and disassociating the sulfur therefrom.

The filter media 108 can also be configured to add preselected reagents or elements or compounds to the fluid during filtration. For example, during water filtration, the filter media 108 can be loaded with a color and/or a flavor that is introduced into water as it moves through the filter assembly 100. In other embodiments, the filter media 108 can be loaded with various other elements or compounds that can be added to the fluid during filtration.

As shown in FIG. 1B, the filter media 108 can be formed into one or more spiral-shaped distributor channels (identified individually as first-third channels 110a-c, respectively, and referred to collectively as channels 110). In the illustrated embodiment, for example, the filter assembly 100 includes three channels 110a-c spaced equally apart from one another, as shown by distances d1, d2, and d3. In other embodiments, the filter assembly 100 can include one, two, or more than three channels 110, and/or the channels 110 can be positioned varying distances apart from one another (i.e., d1, d2, and d3 can differ in magnitude). In further embodiments, the width of the channels 110 (labeled w1, w2, w3, respectively, in FIG. 1B) can be varied such that the differently sized channels 110 receive fluids having different densities. Accordingly, the channels 110 themselves can be used to separate and filter the fluid as it enters the filter assembly 100. This fluid separation provided by the varied depth or width channels can be used to separate blood during dialysis or other medical procedures. Additionally, the channels 110 can each include different filter media 108 to filter different contaminants from the fluid.

The spiraled channels 110 can distribute the fluid entering the filter assembly 100 (e.g., via the first opening 104a) radially across the filter media 108 and provide substantially equal velocity through the channels 110. For example, the channels 110 can begin at a different distance from the opening 104 (e.g., varied depths into the body portion 106 of the canister 102 as measured from the first opening 104a) to lower the impedance toward the center of the spiral and thereby force the fluid outwardly toward the peripheral edge of the filter media 108 to provide essentially equal flow rates through zone 106. This creates a more even flow distribution of the fluid across the filter media 108 and therefore increases the accessed surface area of the filter media 108 that participates in filtration of the fluid. Additionally, because the fluid spreads across the filter media 108 and does not merely pass through its center, the filter media 108 has a reduced likelihood that portions of the filter media 108 in the center will load or clog faster than peripheral portions of the filter media 108. The spiraled channels 110 also create a substantially constant velocity of fluid flow axially along the length of the canister 102. This inhibits the fluid from gathering in stagnant or dead zones where it is unable to be filtered and thus increases the efficiency of the filtration process.

Referring back to FIG. 1A, in various aspects of the technology, the sidewalls of the openings 104 can include threaded portions 118 configured to receive the fitting 120 having spiral features generally similar to the spiral-shaped filter media 108 to further increase fluid distribution across the filter media 108 and further enhance uniform fluid flow through the filter media 108. The threaded portions 118 and/or other engagement features proximate to the openings 104 can also be used to connect with the filter assembly 100 to one or more extensions (not shown). In various embodiments, the extensions can include filters having features similar to the filter assembly 100 and/or other filter configurations and functions. These filter extensions increase the distance the fluid travels through the filter system (e.g., the filter assembly 100 and one or more filter extensions) and increases the dwell time of the fluid to enhance fluid filtration efficiency. In some embodiments, filter extensions can be attached in series with the filter assembly 100 and used to filter various different contaminants from the fluid. For example, the filter assembly 100 can be configured to filter a pre-selected contaminant from the fluid, and the next filter extension in the series can be configured to filter a different contaminant from the fluid. In applications such as water treatment, further extensions can be provided to add trace minerals to improve the taste and/or to provide specific health benefits. In other embodiments, extensions can be attached to the end portions of the filter assembly 100 to transport fluid to and/or from locations.

As shown in FIG. 1A, the filter assembly 100 can include a plurality of zones (identified individually as a first zone 112, a second zone 114 and a third zone 116) that can individually include different filter media 108. In one embodiment, the zones 112, 114 and 116 of the filter media 108 can be used to filter out progressively finer particles as the fluid moves from the inlet to the outlet. For example, the filter media 108 in the first zone 112 can include a coarse, sand-packed filter media 108 to filter out larger particles (e.g., sand, sediment, etc.), and the filter media 108 in the third zone 116 can include a fine, micro-porous ceramic to filter out smaller particles. In some embodiments, one or more of the zones 112, 114 and 116 can include a filter media 108 having anti-microbial filtration components or characteristics (e.g., silver-coated activated carbon) to reduce or eliminate contaminations and/or biofouling in the filter assembly 100 and/or in subsequent processes.

In various embodiments, the filter assembly 100 can include and/or be operably coupled to a heat input or source 122 to facilitate the reaction between the filter media 108 and the contaminant. Heat from the heat source 122 can be transferred to the filter assembly 100 via infrared heating (e.g., from an engine), inductive heating, resistive heating, and/or other sources of heat. When the filter assembly 100 is used on a macro-scale, a renewable energy source, such as solar power, wind power, hydro power, wave power, etc., can be used as the heat source 122 to provide radiant heat for the filter assembly 100. In other embodiments, heat source 122 can include other renewable and nonrenewable energy sources and other suitable heat generators. In selected embodiments, the fluid (e.g., a fuel) can be pre-heated (e.g., by the heat source 122) before it flows into the canister 102 to facilitate filtration reactions (e.g., sulfur with an iron donor or another carbon-loaded filter media 108), and the canister 102 can be insulated to reduce the total energy of the filtration process. The filter assembly 100 can also absorb and transfer heat away from permafrost to both cool the permafrost and facilitate the filtration reactions. In some embodiments, the canister 102 can be made from a transmissive material (e.g., glass) to increase the transfer of radiant heat to or from the filter material 108.

Additionally, the filter assembly 100 can host or perform an exothermic reaction in itself. The filter assembly 100 can therefore be configured to store the heat it generates (e.g., from filtration rations) and reuse it to facilitate further filtration reactions. In other embodiments, it may be desirable to remove heat from the filter assembly 100 during filtration. The heat produced and transferred away from the filter assembly 100 can be used in conjunction with other processes, such as those described in U.S. patent application Ser. No. 13/027, 215, filed Feb. 14, 2011, now issued as U.S. Pat. No. 8,318, 269, and entitled "INDUCTION FOR THERMOCHEMICAL PROCESSES, AND ASSOCIATED SYSTEMS AND METHODS", and U.S. patent application Ser. No. 12/857, 515, filed Aug. 16, 2010, now issued as U.S. Pat. No. 8,147, 599, and entitled "APPARATUSES AND METHODS FOR STORING AND/OR FILTERING A SUBSTANCE", both of which are herein incorporated by reference in their entireties.

In particular embodiments, the filter media 108 can conveniently be utilized as soil nutrients or safely discarded after its filtration capabilities have been exhausted. For example, after the filter media 108 has been loaded with a contaminant, the filter media 108 can be disposed of with the canister 102, or removed from the canister 102 and disposed such that the canister 102 can be reused with a new filter media. In some embodiments, the canister 102 and/or the loaded filter media 108 can be recycled as a building material (e.g., a lightweight, fire-resistant honeycomb drywall) or in the construction of papercrete. As described in further detail below, in other embodiments, the filtered contaminant can be repurposed and/or the filter media 108 can be reused.

Figure 2:
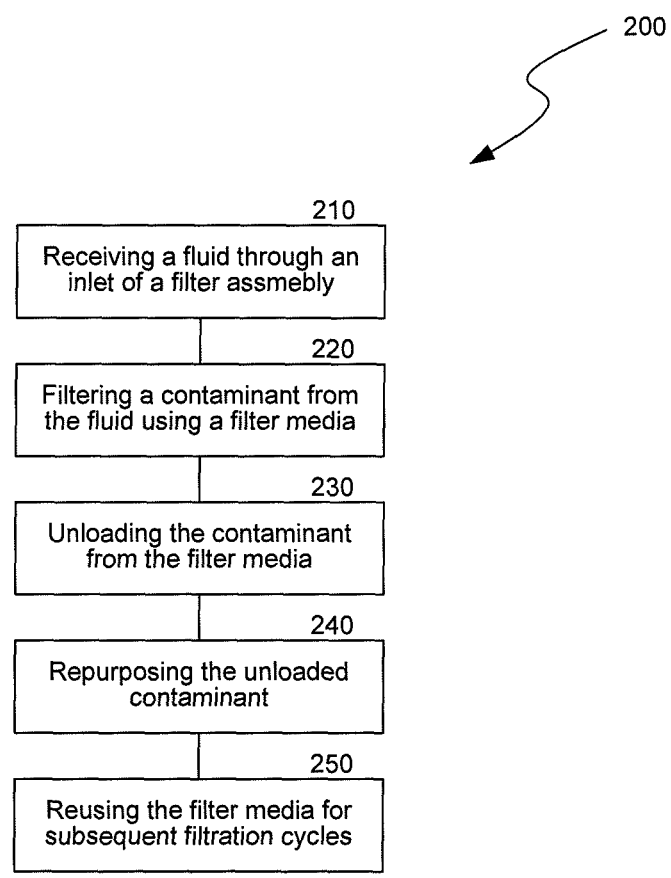
FIG. 2 is a block diagram illustrating a routine for loading and unloading a filtration system in accordance with an embodiment of the present technology.

FIG. 2 is a block diagram illustrating a routine 200 for loading and unloading a filtration system in accordance with an embodiment of the present technology. The routine 200 can include receiving a fluid through an inlet of a filter assembly (block 210) and filtering a contaminant from the fluid using a filter media (block 220). The filter assembly can include features generally similar to the features of the filter assembly 100 described above with reference to FIGS. 1A and 1B. For example, the filter assembly can include a canister housing a filter media made from an architectural construct, steel wool, micro-porous ceramic, calcium, and/or other suitable filter media. As described above, the filter media can be formed into even-flow distributors such as one or more spiral-shaped channels that distribute the fluid across the filter media to allow a greater surface area of the filter media to participate in filtration (i.e., not merely the inner portions of the filter media). Additionally, the spiraled filter media can provide a substantially constant velocity of fluid flow axially along the length of the filter assembly that reduces the likelihood of stagnant zones and therefore enhances the efficiency of filtration.

Once the filter media is loaded with the contaminant (e.g., when the filter media no longer provides adequate filtration), the contaminant or compound thereof can be unloaded from the filter media (block 230). The contaminant can be unloaded by selecting a fluid that will release the particular contaminant or compound thereof, running the fluid across the filter media, and collecting the contaminant in a reservoir. In one embodiment, for example, methane is filtered from a fluid and loaded onto the filter media. The methane can be removed from the filter media (e.g. activated carbon or zeolite) by flowing hydrogen or water (e.g. heated water or steam) across the filter media and releasing the purified methane. In various embodiments, the filter media can be unloaded while it is still in the canister used during filtration. Accordingly, the configuration of the filter assembly can impart similar benefits to unloading the filter media that are loading the filter media during filtration. For example, because the filter media is configured in a spiral-like shape, the fluid is flushed over the filter media in a substantially uniform distribution and at a substantially equal velocity to enhance removal of the contaminant. In other embodiments, the loaded filter media can be removed from the canister before the contaminant is unloaded.

The filter media can be used to filter a wide variety of feedstocks including for example, body fluids, water, wine, waste streams, and the like, for a variety of purposes, for example, to treat pathogenically suspect fluids such as those listed above with UV, ozone and or heat. In operation, the filter assembly can be used in pre-treatment processing or can be used in various combinations of post-treatment processing. In further embodiments, multiple filter assemblies may be placed in series to sequentially remove contaminants or in parallel in a manifold arrangement to accommodate fluctuating or high volumes of feedstock flow.

In some embodiments, the unloaded contaminant can be repurposed in other applications (block 240). Purified methane, for example, can then be repurposed and used as fuel and/or other suitable functions. Iron sulfide (e.g., produced by filtering sulfur through steel wool media) can be unloaded for use during photosynthesis, and calcium sulfate (produced by filtering sulfur through a calcium-loaded media) can be unloaded for use as a nutrient for growing algae, vegetables, etc. In other embodiments, the unloaded contaminant can be reused for other suitable applications and purposes.

In particular embodiments, the filter media can be reused after the contaminant has been unloaded (block 250). For example, the filter media can be made from carbon, silica, alumina, and/or other suitable materials that can be loaded with an element or compound for filtration, unloaded, and then reloaded with the same or a different element or compound for subsequent filtration cycles.

From the foregoing, it will be appreciated that specific embodiments of the technology have been described herein for purposes of illustration but that various modifications may be made without deviating from the disclosure. For example, the filter assembly 100 can have a different aspect ratio than that shown in FIG. 1A, such that the canister 102 is wider than it is long. Such a configuration may be of particular use to filter, for example, gaseous fluids. Certain aspects of the new technology described in the context of particular embodiments may be combined or eliminated in other embodiments. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference in their entirety. Aspects of the disclosure can be modified, if necessary, to employ architectural constructs and thermochemical processes with various configurations and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims but should be construed to include all systems and methods that operate in accordance with the claims. Accordingly, the invention is not limited by the disclosure, but instead, its scope is to be determined broadly by the following claims.

I claim:

1. A filter assembly, comprising:
a canister having a body portion positioned between a first opening at a first proximal end of the canister and a second opening at a second distal end of the canister opposite the proximal end of the canister; and
a filter media in the body portion of the canister, the filter media forming at least a first channel and a second channel, wherein the second channel is spaced apart from the first channel,
wherein:
the first channel and the second channels each have a substantially spiral shape configured to distribute an incoming fluid substantially evenly across the filter media and move the fluid at a substantially equal velocity along an axial length of the body portion,
the first channel has a first width,
the second channel has a second width different than the first width, and
the first and second channels are configured to filter the incoming fluid and separate the fluid based on density.

2. The filter assembly of claim 1 wherein the filter media is graphene.

3. The filter assembly of claim 1 wherein the filter media is configured to chemically react with the incoming fluid to load a constituent of the incoming fluid onto the filter media.

4. The filter assembly of claim 3 wherein the constituent includes sulfur, and wherein the filter media is configured to react directly with the sulfur to load the sulfur to filter media.

5. The filter assembly of claim 1 wherein the filter media is a first filter media, and wherein the body portion includes:
a first zone positioned a first depth into the body portion as measured from the first opening, the first zone including the first filter media; and
a second zone positioned a second depth into the body portion as measured from the first opening, wherein the first depth is less than the second depth, and wherein the second zone includes a second filter media different from the first filter media.

6. The filter assembly of claim 1 wherein the filter media includes an anti-microbial filtration component.

7. The filter assembly of claim 1, further comprising a heat source thermally coupled to the canister, wherein the heat source is configured to transfer heat to the filter media to react the filter media with a constituent of the fluid.

8. The filter assembly of claim 1 wherein the canister comprises a thermally transmissive material.

9. A filter system, comprising:
a housing having a first opening, a second opening, and a body portion between the first and second openings, wherein the first opening is fluidly coupled with the second opening via the body portion;
a plurality of spiral-shaped distributor channels extending through at least a top portion of the body portion, wherein the distributor channels are formed from a filter media configured to remove at least one constituent from a fluid; and
wherein:
the plurality of spiral-shaped distributor channels includes a first, second, and third spiral-shaped distributor channel,
the first spiral-shaped distributor channel is spaced a first distance apart from the second spiral-shaped distributor channel, and
the second spiral-shaped distributor channel is spaced a second distance different than the first distance apart from the third spiral-shaped distributor channel.

10. The filter system of claim 9 wherein the distributor channels are configured to force an incoming fluid outward to distribute the fluid substantially evenly across the filter media.

11. The filter system of claim 9 wherein the body portion includes a plurality of zones spaced along an axial length of the housing, and wherein individual zones include different filter media.

12. The filter system of claim 9, further comprising a heat source thermally coupled to the filter media.

* * * * *